United States Patent [19]

Laurent

[11] 3,797,407
[45] Mar. 19, 1974

[54] DEVICE FOR HAULING VEHICLES WITH RETRACTABLE WHEELS HOLDING DOWN THE TRACTION CABLE

[75] Inventor: Roger Laurent, Chambery, France

[73] Assignee: Poma 2.000 S.A., Fontaine, France

[22] Filed: Dec. 8, 1972

[21] Appl. No.: 313,398

[30] Foreign Application Priority Data
Dec. 24, 1971 France .............................. 71.46685

[52] U.S. Cl. ................. 104/182, 104/173, 104/186, 104/197
[51] Int. Cl. ........................... B61b 7/10, B61b 7/20
[58] Field of Search ............ 104/173, 182, 186, 197

[56] References Cited
UNITED STATES PATENTS
1,032,945  7/1912  Rosebrough ........................ 104/197
1,429,631  9/1922  Reilly ................................. 104/182
2,540,868  2/1951  Ehrhart .............................. 104/182
3,382,816  5/1968  Goforth et al. ..................... 104/197

Primary Examiner—Drayton E. Hoffman
Attorney, Agent, or Firm—Stevens, Davis, Miller & Mosher

[57] ABSTRACT

The invention relates to a device for the hauling of vehicles by a traction cable extended along the track.
The cable supporting and guiding wheels in the way of vehicles path, are fixed to mobile supports, the movement of which into a retracted position being imparted by the vehicle itself.

7 Claims, 5 Drawing Figures

DEVICE FOR HAULING VEHICLES WITH RETRACTABLE WHEELS HOLDING DOWN THE TRACTION CABLE

The invention relates to a device for the hauling of passive individual vehicles of a transport or materials handling installation.

Conventional transport or materials handling installations, in particular funiculars and aerial ropeways have vehicles moving on a carrier track under the action of a traction cable supported or guided by fixed wheels or rollers spaced along the track. On the passing of the vehicle the grip fixing raises or separates the cable from the groove of the guide wheel so as to facilitate the passage of the grip. The passing of the vehicle is effected without the detaching of the vehicle from the drive cable and the traction cable is then replaced in the groove of the guide wheel which prevents any slipping on the ground or other fixed parts. These devices can comprise only restraining guide wheels, fitted on the same side of the cable, generally support wheels, and the choice of the profile and the trajectory of the track is limited by this essential factor.

The object of the present invention is to permit the realization of a hauling device applicable to installations with an undulating and/or sinuous trajectory, the passing over the cable restraining wheels, in this case the support, hold-down and guide wheels is effected without the detaching of the vehicle from the traction cable.

Another object of the invention is to permit the retraction of the restraining wheels that would otherwise come into contact with the vehicle and the grip during the passing of the vehicle. The restraining wheels fitted on the same side as the grip control are fixed on a mobile support capable to move them into a retracted position.

Yet another object of the invention is to realize a reliable and sure control avoiding any false maneuver.

The mobile support of the wheel restraining the cable advantageously consists of a lever pivoting on a spindle parallel with the centreline of the track. The pivoting of the support lever makes it possible to take the supported wheel out of the way of the grip fixed to the vehicle, and the actioning of the pivoting, which may of course be achieved in any suitable manner, for example by hydraulic or pneumatic or electro-magnetic systems actuated on the arrival of a vehicle, is preferably achieved positively by the vehicle itself which is equipped with a double rail with a cross section in the form of a cap, which engages a roller fitted on the end of the support lever and causes during the passing of the vehicle the moving of the lever into the retracted position. The synchronization of the retraction of the lever with the movement of the vehicle is thus ensured, any false maneuver being excluded. The return of the lever to its initial position following the passing of the grip is also effected by the double rail the profile of which is curved in the opposite direction, so as to bring about the pivoting of the lever into the active position, in which the wheel is ready to take the traction cable after the vehicle has moved away. The active position of the lever is determined by means of a stop and a spring which brings the lever to rest on the stop. The lever thus remains in this active position, determined by the stop, after the roller has left the rail which is fixed to the vehicle until the cable returns to the groove in the wheel. Then, the reaction of the cable on the wheel locks the lever in this position, which constitutes a position of stable equilibrium, the spindle being aligned with the reaction due to the cable.

The position of the wheels in relation to the track is selected so as to extract and separate the cable during the passing of the vehicle or carriage. In the case of a hold-down wheel, the grip imparts to the cable a downward movement which forces it to leave the groove in the wheel by moving down, and in the opposite manner, in the case of a support wheel, this is so arranged that the cable is lifted out by the grip during the passing of the carriage.

Another object of the invention is to permit the realization of a transport installation of considerable length with fast-moving passive vehicles, in particular of the type which is the subject of U.S. patent application Ser. No. 240,963 of Apr. 4, 1972.

Other objects and advantages of the invention will become apparent from the following description of an embodiment of the invention, with reference to the accompanying drawings in which.

Figure 1:
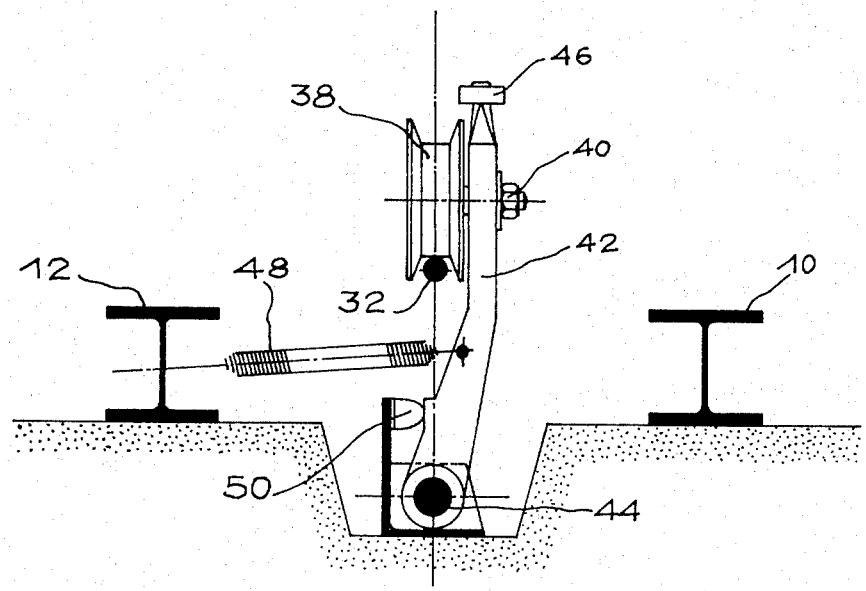
FIG. 1 is a side view of track equipped with a retractable hold-down wheel according to the invention.
Figure 2:
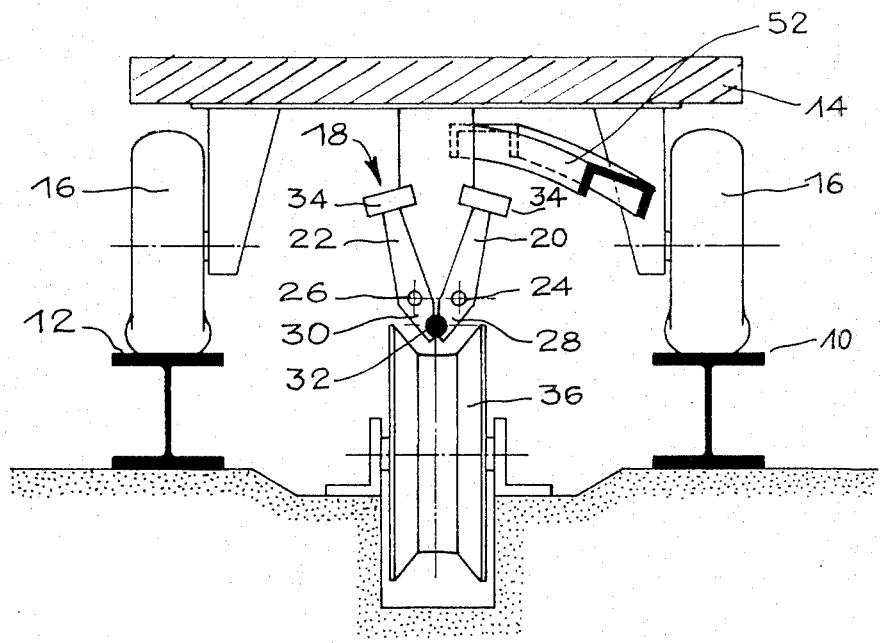
FIG. 2 is a median transverse section of a vehicle circulating on a track according to FIG. 1, over a cable support wheel.

The invention will be described more particularly with reference to FIG. 1 – 5, as being applied to an installation according to the above-mentioned patent application with a track consisting of two rails on which runs a vehicle or carriage fitted with a grip in the form of a clip capable of gripping a traction cable from above, the retractable wheels being in this case cable hold-down wheels. It is well understood that the invention is applicable to suspended vehicles of the monorail, bi-rail and even carrier cable types, the coupling grip being capable of gripping the cable from the side or from underneath in which case the retractable wheels would be guide wheels or wheels supporting the traction cable. On these figures, a track is formed by two rails, 10, 12, laid on ballast or installed on towers (not shown) with running surfaces on which circulate vehicles or carriages 14 with two pairs of wheels 16, for instance with pneumatic tires. Carriage 14 is guided on track 10, 12 in some manner, for instance by means of guide wheels (not shown). With each carriage 14 is associated a grip 18 in the form of tongs, with two levers 20, 22, hinged at an intermediate point on two fixed spindles 24, 26 and having at their ends jaws 28, 30 capable of gripping a traction cable 32. The opposite ends of levers 20, 22 are fitted with operating rollers 34, able to act in conjunction with fixed rails bringing about in a manner well known in itself, the opening and closing of grip 18. Levers 20, 22 are held in the closed position by means of an elastic device (not shown). Such a grip is described in U.S. Patent application Ser. No. 213,954 of Dec. 30, 1971 to which reference may advantageously be made for fuller details. Cable 32 is a traction cable extending along track 10, 12, and driven by a drive terminal (not shown). Traction cable 32 rests on wheels mounted so as to rotate on fixed spindles, spaced along the track, including support wheels 36, one of which is shown in FIG. 2, and hold-down wheels 38, one of which is shown in FIG. 1. The support wheels 36 and hold-down wheels 38 guide traction cable 32 and prevent any contact with fixed parts or with the ground, while maintaining the cable in a profile near that of the track 10, 12. It may be seen in FIG. 2 that support wheels 36 in no way hinder the passage of vehicle 14 and grip 18, jaws 28, 30 of the latter being raised in relation to the tread of wheel 36, in such a manner as to cause traction cable 32 to leave the groove of wheel 36 on the passing of vehicle 14. Thus are avoided, in a manner well known, shock or jerks due to the passing of the grip over support wheels 36.

Hold-down wheels 38, on the contrary, enclose completely the outerline of the grip 18 (see FIG. 1) and carriage 14 can pass only after the retraction of wheels 38 by means of the device which will be described below. Wheel 38 is mounted so as to rotate on a spindle 40, fixed on to a lever 42 one end of which is mounted so as to pivot on a spindle 44 parallel to the longitudinal direction of track 10, 12. The opposite end of lever 42 has an operating roller 46 with an axis of rotation appreciably aligned with lever 42. A traction spring 48, fixed at one end to a fixed point on rail 12 and to lever 42 holds the latter in its working position, resting aginst a fixed stop 50 so mounted as to position the hold-down wheel 38 in the median vertical plane of track 10, 12, in which is also spindle 44. This position is one of stable equilibrium, the vertical component of the force exerted by the traction cable on wheel 38 passing through spindle 44 and being directed upwards.

Figure 4:
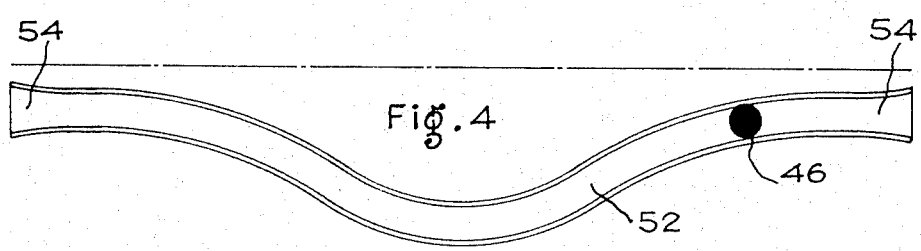
FIG. 4 is a schematic view in plan, illustrating the profile of the retracting rail of the wheel according to FIG. 1.
Figure 5:
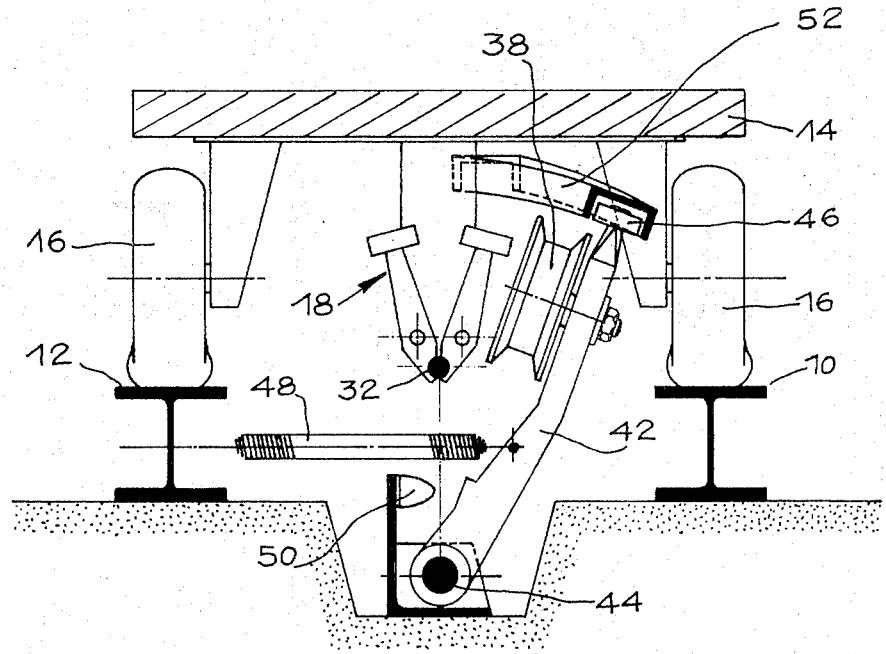
FIG. 5 is a view analogous with that of FIG. 2, showing the vehicle over a retracted hold-down wheel, according to FIG. 1.

On the carriage 14 is fixed an operating cam or rail 52, with a section in the form of an inversed U, the lateral flanges of which can enclose roller 46. Cam 52 constitutes an operating ramp extending in the longitudinal direction of the track and the ends 54 of which are opened out to facilitate a smooth entry of roller 46. The profile of rail 52, shown in FIG. 4, is in the form of a cap imparting to roller 46, as it passes through the rail, a lateral movement to the right in FIG. 5, in the middle part. It is seen in FIG. 5, that in this position of offset to the right of roller 46, support 42 is placed in a retracted position, thus permitting the passing of grip 18 and carriage 14. The lateral reaction exerted on the carriage by roller 46, is taken up by the guide wheels (not shown).

Figure 3:
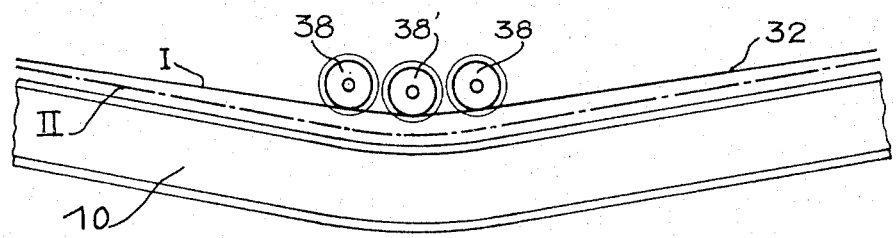
FIG. 3 shows schematically in continuous lines the profile of the track on a hollow or depressed section, as well as the position of the hold-down wheels and traction cable, and in dotted lines the position taken by the cable as the vehicle passes.

Traction cable 32 must obviously have left the groove of the hold-down wheel 38 before there is any lateral movement of the wheel. To achieve this the height of hold-down wheel 38 in relation to track 10, 12 is so determined that on the approach of a vehicle the grip imparts to traction cable 32 a downwards movement, taking it away from wheel 38. It will be understood that the weight of carriage 14 must be greater than the reaction of the traction cable in order to bring about this lowering, and this is generally the case. FIG. 3 shows schematically a section of track 10 in a hollow equipped with three successive hold-down wheels 38, 38', 38''. The path of traction cable 32, in the absence of a vehicle on the section of track 10, is represented in FIG. 3 by curve I, cable 32 being maintained by the hold-down wheels 38, 38', 38'' near the running surface of track 10, 12. In the same figure is shown by dotted lines II the successive positions of the traction cable 32 held by grip 18 during the passing of vehicle 14. It is easily seen that curve II is parallel with track 10, the grip being rigidly connected with vehicle 14 and traction cable 32 being removed from wheels 38, 38', 38'' during the passing of the vehicle. The level of the hold-down wheels is of course different from that of the support wheels.

The functioning of the haulage device is as follows:

Traction cable 32 extends over the length of the trajectory resting against support wheels 36 and hold-down wheels 38. Vehicles 14 are towed by cable 32 to which they are attached by means of detachable grips 18. The longitudinal profile of track 10, 12 and that of the traction cable are so established that when the vehicle is not passing the cable is always in positive contact with the support and hold-down wheels. The grip 18 passes without difficulty over the support wheels 36, the relative position of the grip in relation to these wheels being determined in such a manner as to raise slightly cable 32 and thus avoid any mechanical contact between grip 18 and wheel 36. After the grip has passed the cable returns automatically to the groove in support wheel 36.

The passing over a compression or hold-down wheel is effected in the following manner:

On the approach of vehicle 14, rail 52 meets roller 46, which penetrates, guided if necessary by the enlarged part 54, between the lateral wings of the rail in the form of an inversed U. Simultaneously grip 18 imparts to the traction cable a downwards movement causing it to leave the groove of wheel 38. The travel of vehicle 14 continuing roller 46 advances in the cam in the form of rail 52 and undergoes a lateral movement to the right, on FIG. 5, causing the pivoting of support 42 on spindle 44, in opposition to the force exerted by return spring 48. The position of maximum lateral movement corresponds with the passing of the hold-down wheel by grip 18, and following this roller 46 is returned to the working position by the symmetrical outline of cam 52. The operation of retraction and its return to its working position of hold-down wheel 38 is a positive operation, realized by rail 52 in perfect synchronism with the travel of vehicle 14. Any false maneuver or mal-adjustment is thus impossible and the device is remarkably reliable and safe in operation.

Following the passing of vehicle 14, roller 46 having left rail 52, lever 42 is maintained in its working position against stop 50 by spring 48, pending the return into position of traction cable 32 which enters the groove of wheel 38 as soon as the vehicle 14 has travelled over a sufficient distance. It may be seen that the system of spring 48 and stop 50 prevents any untimely rotation of lever 42 when cable 32 leaves the groove in the wheel 38 before the engagement of roller 46 in rail 52, or inversely, when roller 46 leaves rail 52 before traction cable 32 returns to the groove in wheel 38.

Grip 18 is advantageously fitted in the central part of the carriage or vehicle 14, and as the lever 42 pivots over a small angle, the length of rail 52 may be maintained below that of vehicle 14.

What is claimed is:

1. A device for hauling passive individual vehicles for a transport or materials handling installation, comprising:
- a track on which the said vehicles run,
- an endless traction cable, having an outer surface and extending over the length of the said track,
- an operable gripping device with a part capable of clamping on to the said outer surface and associated and secured to each vehicle for the purpose of coupling the latter to the traction cable,
- components for operating and securing the said gripping device extending laterally on one side of the said outer surface of the cable in clamped position of the gripping device,
- grooved wheels spaced apart along the track and mounted laterally for restraining the said traction cable, the relative positions of the said gripping device, imposed by the track on which the vehicle runs and of the said wheels with grooves for the cable, being offset so as to bring about, on the passing of a vehicle over the wheels, the extraction of the said traction cable, clamped by the said gripping device, from the groove in the wheel,
- at least one of the said restraining wheels mounted laterally on the same side as the said gripping device operating and securing components,
- a mobile support for said one restraining wheel capable of taking up a working position in which the said one wheel can guide the cable and a retracted position in which the support and said one wheel do not hinder the free passage of the vehicle and the associated gripping device, coupled to the cable,
- and a device for actuating the movement of the said mobile support on the passing of the vehicle.

2. A device according to claim 1, comprising:
- support and hold-down wheels for the said traction cable, the said wheels having a working surface in contact with the traction cable arranged respectively below and above the trajectory followed by the said gripping device clamped on to the cable,
- a gripping device operating and securing components fitted above the traction cable,
- a mobile support associated with each hold-down wheel and
- a device bringing about the movement of the said mobile support upon the passage of a vehicle, in such a manner as to leave a free passage for the vehicle and the gripping device clamped on to the traction cable, the latter being maintained by the gripping device in a lowered position in which it is disengaged from the groove in the hold-down wheel.

3. A device according to claim 1, wherein said device for actuating the movement of the said mobile support comprises follower means fixed to the said mobile support and a cam surface fixed to the said vehicle, which extends in the direction of said track and acts on the passing of a vehicle in conjunction with the said follower means, so as to move the said mobile support into the said retracted position before the gripping device passes by the said wheel and to replace the said mobile support in its working position after the gripping device has passed.

4. A haulage device according to claim 3, in which the said mobile support has a lever fitted so as to pivot in a plane appreciably perpendicular to the cable direction and follower means carried by the said lever to bring about the pivoting of the latter, and move the said mobile support into the said retracted position and thereafter into the said working position.

5. A haulage device according to claim 4, provided with an elastic means of pulling the said lever into the working position, and a fixed stop means on which rests the lever when in the working position which is thus defined.

6. A haulage device according to claim 5, in which said lever extends in the working position in the direction of the reaction exerted on the wheel by the traction cable so as to be locked in the working position by said reaction.

7. A haulage device according to claim 4, with a double cam surface operating a positive pivoting of the said lever in the two directions of pivoting.

* * * * *